Aug. 13, 1940.  L. GEROSA ET AL  2,211,720
TRANSPORTING AND DUMPING VEHICLE
Filed Jan. 26, 1939
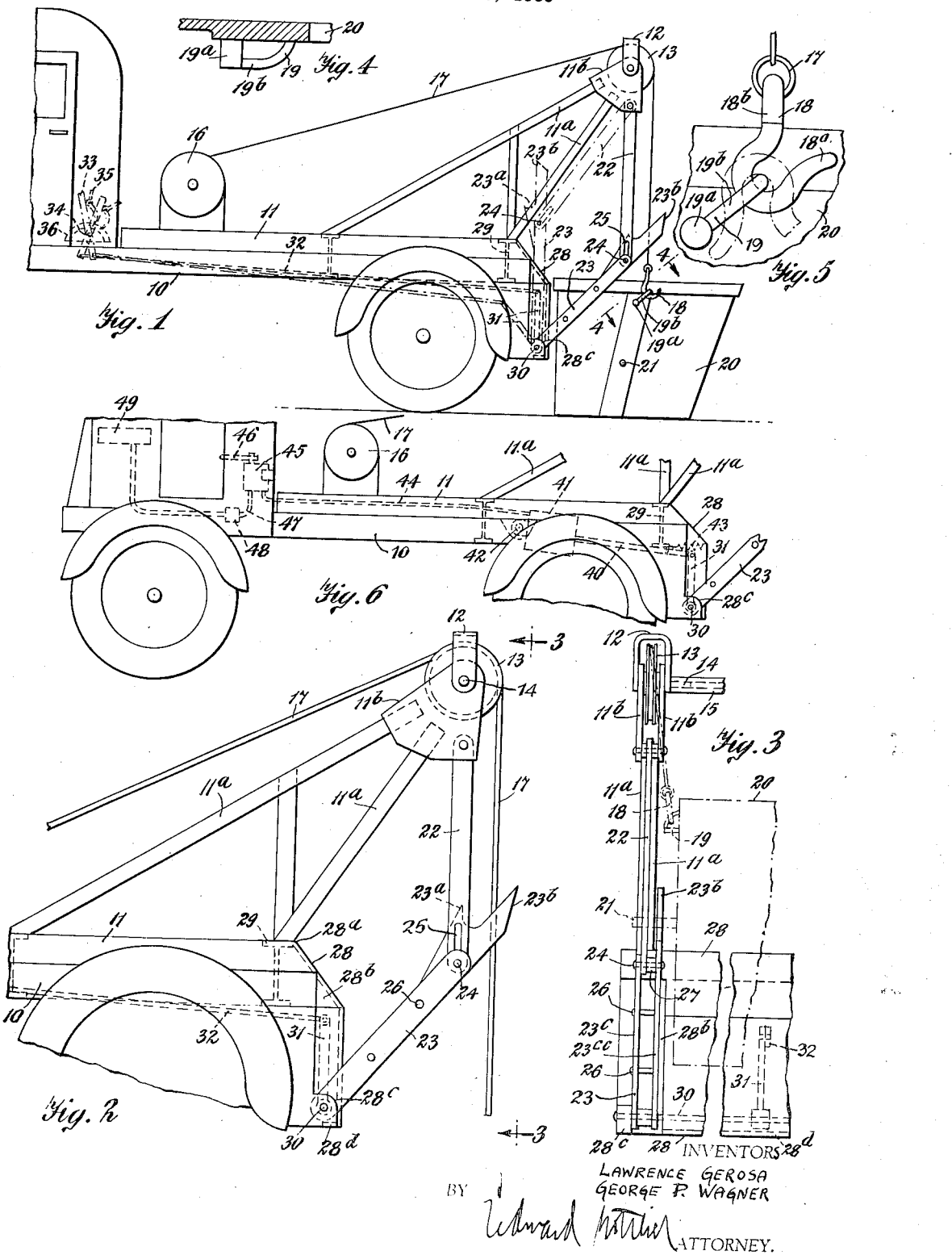
INVENTORS
LAWRENCE GEROSA
GEORGE P. WAGNER
BY
ATTORNEY.

Patented Aug. 13, 1940

2,211,720

UNITED STATES PATENT OFFICE 2,211,720

TRANSPORTING AND DUMPING VEHICLE

Lawrence Gerosa and George P. Wagner, Bronx, N. Y., assignors to Speed-Dump, Inc., New York, N. Y., a corporation of New York Application January 26, 1939, Serial No. 252,874

6 Claims. (Cl. 214—116)

This invention relates to new and useful improvements in a transporting and dumping vehicle.

The invention has for an object the construction of a vehicle as mentioned which is characterized by cable supporting means for hoisting and lowering a skip provided with bottom pegs to facilitate the dumping of the skip, and a novel arrangement for supporting the skip in hoisted position for facilitating the dumping of the skip and for permitting the skip to be lowered without dumping when so required.

Heretofore devices have been made embodying the broad features enumerated in the previous paragraph, but such devices have numerous defects. An outstanding defect is that the bottom pegs of the skip will not at all times, and under all conditions, positively engage the coacting means mounted for this purpose on the vehicle. Sometimes one or the other of the pegs will miss its cooperative element and then if the operator of the device (who is in the cab of the vehicle and not in a position to readily see the faulty connection) does not recognize the disconnection in time but continues to lower or dump the skip, improper operation will result.

Still further the invention contemplates so constructing the mechanism which cooperates with the skip to be positive in operation irrespective of an inclination or hill upon which the vehicle happens to be at that particular time.

Still further the invention proposes a construction which will prevent the bottom pegs of the skip from accidentally jumping out from their supporting parts during transit of the vehicle, particularly over rough roads.

A further object of the invention resides in providing a construction which will positively release the bottom pegs of the skip when it is desired to lower the same.

Still further the invention proposes to so arrange the parts as to prevent lateral swinging of the skip during transit.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a transporting and dumping vehicle and skip constructed according to this invention.

Fig. 2 is a fragmentary enlarged detailed view of a portion of Fig. 1.

Fig. 3 is a fragmentary end elevational view looking in the direction of the line 3—3 of Fig. 2.

Fig. 4 is a fragmentary enlarged sectional view taken on the line 4—4 of Fig. 1.

Fig. 5 is a fragmentary enlarged sectional view of the upper portion of the skip shown in Fig. 1 with a certain hook thereof indicated in a different position.

Fig. 6 is a fragmentary side elevational view of a transporting and dumping vehicle constructed according to another form of the invention.

The transporting and dumping vehicle, according to this invention, includes a motor driven chassis 10 upon which a frame 11 is fixedly mounted. This frame is provided with a rear portion in the form of a rearward and upwardly vertically extending arm 11a on each side of the frame. Each arm 11a is formed from several bars secured at their lower ends upon the frame 11 and at their upper ends being provided with a pair of spaced plates 11b. A bridging element 12 is secured over the top portion of the plates 11b to hold them as a unit. A pulley 13 is mounted on the top of each rear arm between the plates 11b. The pulley 13 is rotatively supported on a stud 14 which is mounted on a tubular member 15 extended transversely between the upper ends of the rearwardly projecting arms 11a.

A hoisting winch 16 is mounted upon the frame 11 and is provided with rearwardly extending cables 17 which extend over the pulleys 13 and which at their lower ends are provided with hooks 18. These hooks engage eye elements 19 mounted on the sides of the skip 20. Each of the eye elements 19 has a post portion 19a and a curved arm portion 19b extending upwardly and rearwardly at an angle (see Fig. 5). The hook 18 is adapted to engage the curved portion 19b and the parts are so proportioned that the hook cannot accidentally slip out from the eye element. This is so particularly in view of the fact that the hook 18 has an extra long free and curved end 18a which will strike the post portion 19a when the cable 17 is released and the hook falls down in one direction. If the hook falls down in the other direction it will not be capable of moving down further than the curved portion 19b since it is formed with an enlarged eye portion 18b at the point where the cable 17 connects with it. Because of the construction of the hook and eye it will be impossible for the hoisting means to accidentally lose its skip. To remove the hook 18 it is required that it be turned and lifted in a particular manner to disengage the extended and curved end 18a from the eye element.

The skip 20 is for the purpose of holding earth or other heavy materials, and is of a width adapted to engage between the arms 11a (note the dot and dash lines in Fig. 3). It should be understood that this figure is a fragmentary view of one side of the vehicle and that the other side, which is not shown, is an identical reproduction of the side shown.

The eye elements 19 of the skip are arranged upon the vertical center of gravity thereof so that the skip may be hoisted without any tendency of tilting in one direction or the other. The skip 20 is also provided with bottom pegs 21 at the sides thereof slightly forwards and downwards of its center of gravity. The word "forwards" is used in relation to the front or forward end of the vehicle.

A pair of top side members 22 are pivotally supported at their top portions between the plates 11b of the arms 11a and these top side members 22 depend freely so as to be capable of swinging forwards and rearwards. A pair of bottom side members 23 are pivotally supported at their bottom end portions and are directed upwards and rearwards at an inclination and at their upper ends have forked portions which include the fingers 23a and 23b. Between these forked portions the bottom pegs 21 are adapted to engage at points immediately to the rear of the rear vertical edges of the top side members 22. A means is provided for connecting the top and bottom side members together to swing forwards and rearwards as a unit. These connecting means include pins 24 mounted upon the bottom side arms 23 and passing through elongated slots 25 formed in the lower portions of the top side arms 22. Each of the bottom arms 23 is formed from an adjacent pair of arm portions 23c and 23cc. These arm portions are held in spaced positions and connected together as a unit by spacer and holding elements 26. The pins 24 engage through the arm portions 23c and 23cc. The top side members 22 are disposed between the arm portions 23c and 23cc. A washer 27 is mounted upon each of the pins 24 to fill any excess space between the side members 22 and the arm portions 23c and 23cc.

A cover skirt 28 is mounted upon the rear of the chassis 10. This skirt portion has a top edge 28a which is welded to an I beam 29 mounted transversely across the rear end of the frame 11. The skirt 28 extends the entire width of the rear portion of the vehicle to points outside of the rearwardly extending arms 11a. At each of the ends the skirt 28 is formed with vertically extending recessed areas 28b. It is within these areas that the bottom side arms 23 are adapted to extend. From the bases of the recessed areas 28b, at the bottom of the skirt, there are lug portions 28c. A rod 30 passes through the lug portions 28c and through the bottom portion of the skirt 28 and forms a shaft upon which the bottom side arms 23 are fixedly mounted. The bottom edge 28d of the skirt 28 is bent horizontally in the form of an forwardly extending flange.

A radial arm 31 is fixedly mounted on an intermediate portion of the shaft 30 and is connected with a connecting rod 32 which extends to the cab portion of the vehicle. At the cab portion this rod 32 is connected to a hand lever 33 pivotally mounted at the point 34 and provided with a manually controlled catch 35 operating upon an arcuate complementary holding element 36 by which the handle 33 may be locked in forward or rearward positions.

The operation of the device is as follows:

When it is desired to carry the skip 20 and a load in the skip it is required that the handle 33 be moved rearwards so that the connecting rod 32 is pulled forwards. This will move the radial arm 31 forwards and pivot the shaft so that the bottom side arms 23 pivot forwards to the positions indicated by the dot and dash lines in Fig. 1. It should be noted that because of the pins 24 the top side arms 22 will also be moved forwards by the bottom side arms. The bottom side arms now extend forwards within the recesses 28b at the sides of the cover skirt 28. Incidentally, this represents the inoperative position of the mechanism and the truck may be driven around without a skip with the parts in this condition. The skip 20 may now be hoisted up by proper operation of the winch 16.

When the skip 20 has reached a position in which the pegs 21 are above the path of motion of the fingers 23b of the fork ends of the bottom side members 23, the handle 33 is moved forwards to move the rod 32 rearwards and so pivot down the bottom side members 23. These members will move downwards until the arms 22 are substantially vertical and the pins 24 rest in the bottom ends of the slots 25. The skip 20 may now be lowered. Attention is called to the fact that the finger portions 23b project rearwards to quite some distance so that should the truck be resting on an inclination the pegs 21 may still strike against the top edges of the fingers 23b. As the skip 20 is lowered the pegs 21 will slide downwards along the top edges of the fingers 23b and finally seek a position in the junction between the fingers 23a and the fingers 23b and the rear edges of the top side arms 22. The dot and dash lines in Fig. 3 indicate this particular position of the skip and the bottom pegs. The skip with its load may be carried around in this condition. Or the skip may be dumped by letting out more cable. Then the skip will pivot rearwards using the bottom pegs as a trunnion.

The skip may be removed from the vehicle without dumping by first hoisting it up slightly, then moving the bottom side members forwards as previously explained, and then lowering the skip.

In the form of the invention shown in Fig. 6 there is a modified means for extending and retracting the side members 22 and 23. This means is characterized by the fact that the radial arm 31 pivotally connects with the piston rod 40 of a vacuum cylinder 41 supported by a trunnion 42 connected with the frame 11. A spring 43 at one end is connected with the rod 40 and at the other end is secured upon the skirt 28. A pipe 44 connects with the vacuum cylinder 41 and with a valve 45 mounted in the cab of the vehicle. This valve has a controlling handle 46. The valve 45 also connects with a line 47 provided with a check valve 48. This line 47 extends to the intake manifold 49 of the gasoline engine of the vehicle.

The operation of this device is as follows:

The handle 46 may be manipulated to connect the vacuum from the intake manifold 49 with the vacuum cylinder 41 causing the rod 40 to be drawn inwards. This pivots the radial arm 31 anti-clockwise to pivot the bottom side members 23 forwards as previously described.

The vacuum may be maintained within the cylinder in this manner as long as the engine of the motor vehicle operates. The side arms 23 may be moved back into their initial positions by moving the handle 46 to break the vacuum in the cylinder 41. The spring 43 then assists in returning the side members 23 into their rearward extended positions.

While we have illustrated and described our invention with some degree of particularity, we realize that in practice various alterations therein may be made. We therefore reserve the right and privilege of changing the form of the details of construction or otherwise altering the arrangement of the correlated part without departing from the spirit or the scope of the appended claims.

Having thus described our invention, what we claim as new and desire to secure by United States Letters Patent is:

1. A transporting and dumping vehicle, comprising a motor driven vehicle having a chassis, a frame mounted on the rear portion of said chassis, and having a pair of spaced vertical rearwardly extending arms, a skip for holding earth and other heavy materials and adapted to engage between said arms and having top pegs at its sides above its center of gravity by which the skip may be hoisted and also having bottom pegs at its sides slightly forwards and downwards of its center of gravity, cable means guided over said arms and attached to said top pegs to hoist and lower said skip in a way so that the skip is free to swing forwards and rearwards, a pair of side members pivotally supported at their top portions on said arms to swing freely forwards and rearwards, a pair of bottom side members pivotally mounted at their bottom end portions on said chassis and directly upwards and rearwards and adapted to swing freely forwards and rearwards, pins on one pair of said side members engaging slots in the other pair of said side members for moving the top side members in unison with the bottom side members forwards and rearwards as the bottom side members are moved, forked portions on the bottom pair of said side members into which said bottom pegs may be engaged when the skip is lowered with side members in rearward positions, and means for moving said bottom side members forwards and rearwards.

2. A transporting and dumping vehicle, comprising a motor driven vehicle having a chassis, a frame mounted on the rear portion of said chassis and having a pair of spaced vertical rearwardly extending arms, a skip for holding earth and other heavy materials and adapted to engage between said arms and having top pegs at its sides above its center of gravity by which the skip may be hoisted and also having bottom pegs at its sides slightly forwards and downwards of its center of gravity, cable means guided over said arms and attached to said top pegs to hoist and lower said skip in a way so that the skip is free to swing forwards and rearwards, a pair of side members pivotally supported at their top portions on said arms to swing freely forwards and rearwards, a pair of bottom side members pivotally mounted at their bottom end portions on said chassis and directly upwards and rearwards and adapted to swing freely forwards and rearwards, pins on one pair of said side members engaging slots in the other pair of said side members for moving the top side members in unison with the bottom side members forwards and rearwards as the bottom side members are moved, forked portions with short front fingers and long rear fingers on the bottom pair of said side members into which said bottom pegs may engage when the skip is lowered with the side members in rearward positions and with the said longer fingers guiding the said bottom pegs to the bottoms of said forked portions, and means for moving said bottom side members forwards and rearwards.

3. A transporting and dumping vehicle, comprising a motor driven vehicle having a chassis, a frame mounted on the rear portion of said chassis, and having a pair of spaced vertical rearwardly extending arms, a skip for holding earth and other heavy materials and adapted to engage between said arms and having top pegs at its sides above its center of gravity by which the skip may be hoisted and also having bottom pegs at its sides slightly forwards and downwards of its center of gravity, cable means guided over said arms and attached to said top pegs to hoist and lower said skip in a way so that the skip is free to swing forwards and rearwards, a pair of side members pivotally supported at their top portions on said arms to swing freely forwards and rearwards, a pair of bottom side members pivotally mounted at their bottom end portions on said chassis and directly upwards and rearwards and adapted to swing freely forwards and rearwards, pins on one pair of said side members engaging slots in the other pair of said side members for moving the top side members in unison with the bottom side members forwards and rearwards as the bottom side members are moved, forked portions on the bottom pair of said side members into which said bottom pegs may engage when the skip is lowered with the side members in rearward positions, and means for moving said bottom side members forwards and rearwards, each of said bottom side members comprising a pair of side member sections spaced from each other and held together as a rigid unit by spacer and holding elements, and the upper ends of said side member sections straddling the bottom end of its said top side member, and its said pin engaging though all of these parts.

4. A transporting and dumping vehicle, comprising a motor driven vehicle having a chassis, a frame mounted on the rear portion of said chassis, and having a pair of spaced vertical rearwardly extending arms, a skip for holding earth and other heavy materials and adapted to engage between said arms and having top pegs at its sides above its center of gravity by which the skip may be hoisted and also having bottom pegs at its sides slightly forwards and downwards of its center of gravity, cable means guided over said arms and attached to said top pegs to hoist and lower said skip in a way so that the skip is free to swing forwards and rearwards, a pair of side members pivotally supported at their top portions on said arms to swing freely forwards and rearwards, a pair of bottom side members pivotally mounted at their bottom end portions on said chassis and directly upwards and rearwards and adapted to swing freely forwards and rearwards, pins on one pair of said side members engaging slots in the other pair of said side members for moving the top side members in unison with the bottom side members forwards and rearwards as the bottom side members are moved, forked portions on the bottom pair of said side members into which said bottom pegs may engage when the skip is lowered with the side members in rearward positions, and means for moving said bottom side members forwards and rearwards, each of said bottom side members comprising a pair of side member sections spaced from each other and held together as a rigid unit by spacer and holding elements, and the upper ends of said side member sections straddling the bottom end of its said top side member, and its said pin engaging through all of these parts, said forked portions being on the inner sections of said bottom side members.

5. A transporting and dumping vehicle, comprising a motor driven vehicle having a chassis, a frame mounted on the rear portion of said chassis and having a pair of spaced vertical rearwardly extending arms, a skip for holding earth and other heavy materials and adapted to engage between said arms and having top pegs at its sides above its center of gravity by which the skip may be hoisted and also having bottom pegs at its sides slightly forwards and downwards of its center of gravity, cable means guides over said arms and attached to said top pegs to hoist and lower said skip in a way so that the skip is free to swing forwards and rearwards, a pair of side members pivotally supported at their top portions on said arms to swing freely forwards and rearwards, a pair of bottom side members pivotally mounted at their bottom end portions on said chassis and directly upwards and rearwards and adapted to swing freely forwards and rearwards, pins on one pair of said side members engaging slots in the other pair of said side members for moving the top side members in unison with the bottom side members forwards and rearwards as the bottom side members are moved, forked portions on one pair of said side members into which said bottom pegs may be engaged when the skip is lowered with the side members in rearward positions, and means for moving said bottom side members forwards and rearwards, comprising a vacuum cylinder operated by a suction line connected with the intake manifold of the motor of said motor driven vehicle, said suction line being provided with a check valve and with a manually controlled valve by which the suction may be turned on or cut off.

6. A transporting and dumping vehicle, comprising a motor driven vehicle having a chassis, a frame mounted on the rear portion of said chassis and having a pair of spaced vertical rearwardly extending arms, a skip for holding earth and other heavy materials and adapted to engage between said arms and having top pegs at its center of gravity by which the skip may be hoisted and also having bottom pegs at its sides slightly forwards and downwards of its center of gravity, cable means guides over said arms to attach to said top pegs to hoist and lower said skip in a way so that the skip is free to swing forwards and rearwards, a pair of side members pivotally supported at their top portions on said arms to swing freely forwards and rearwards, a pair of bottom side members pivotally mounted at their bottom end portions on said chassis and directly upwards and rearwards and adapted to swing freely forwards and rearwards, pins on one pair of said side members engaging slots in the other pair of said side members for moving the top side members in unison with the bottom side members forwards and rearwards as the bottom side members are moved, forked portions on one pair of said side members into which said bottom pegs may be engaged when the skip is lowered with the side members in rearward positions, and means for moving said bottom side members forwards and rearwards, comprising a vacuum cylinder operated by a suction line connected with the intake manifold of the motor of said motor driven vehicle, said suction line being provided with a check valve and with a manually controlled valve by which the suction may be turned on or cut off, said vacuum cylinder being supported by a trunnion and having a piston rod extending rearwards and pivotally connected with the radial arm controlling said bottom side members

LAWRENCE GEROSA.
GEORGE P. WAGNER.